(12) United States Patent
Dunigan

(10) Patent No.: US 8,733,291 B2
(45) Date of Patent: May 27, 2014

(54) WILD BIRD CATCH AND RELEASE DEVICE AND METHOD OF CATCHING AND RELEASING WILD BIRDS

(75) Inventor: Andrea Dunigan, Springdale, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 29 days.

(21) Appl. No.: 12/954,215

(22) Filed: Nov. 24, 2010

(65) Prior Publication Data

US 2011/0126777 A1    Jun. 2, 2011

Related U.S. Application Data

(60) Provisional application No. 61/264,398, filed on Nov. 25, 2009.

(51) Int. Cl.
*A01K 31/06* (2006.01)

(52) U.S. Cl.
USPC .......................................... 119/463; 119/713

(58) Field of Classification Search
USPC ........... 119/69.5, 72.5, 73, 74, 713, 428, 430, 119/432, 433, 434, 435, 453, 454, 459, 460, 119/462, 463, 464, 472, 473, 339, 342, 344
See application file for complete search history.

(56) References Cited

U.S. PATENT DOCUMENTS

| | | | |
|---|---|---|---|
| 1,384,610 A | 7/1921 | Gorniak | |
| 1,391,489 A | 9/1921 | Nawracaj et al. | |
| 1,677,723 A | 7/1928 | Maxwell | |
| 1,772,003 A * | 8/1930 | Hennings | 119/460 |
| 2,567,664 A * | 9/1951 | Ewell Willis G | 119/330 |
| 2,682,726 A | 7/1954 | Gustin | |
| 2,897,627 A | 8/1959 | Neid | |
| 3,393,468 A | 7/1968 | Wood | |
| 3,815,549 A * | 6/1974 | Opmeer | 119/459 |
| 4,015,176 A | 3/1977 | Shanahan et al. | |
| 4,030,229 A | 6/1977 | Sale | |
| 4,149,490 A | 4/1979 | English | |
| 4,181,612 A * | 1/1980 | Trail | 119/246 |
| 4,471,721 A * | 9/1984 | Vail | 119/428 |
| 4,563,835 A | 1/1986 | Job | |
| 4,567,688 A * | 2/1986 | McKee | 43/61 |
| 4,774,785 A | 10/1988 | Fuhrman | |
| 4,779,373 A * | 10/1988 | Krenson | 43/66 |
| 4,829,701 A | 5/1989 | ImBrogno | |
| 5,325,622 A | 7/1994 | Merickel | |
| 5,596,950 A * | 1/1997 | Briggs et al. | 119/489 |
| 5,782,035 A * | 7/1998 | Locke et al. | 47/79 |
| 5,924,380 A * | 7/1999 | Rayborn | 119/51.5 |
| 6,629,509 B1 * | 10/2003 | Fernandez | 119/452 |
| 7,117,819 B2 * | 10/2006 | Marshall | 119/428 |

(Continued)

*Primary Examiner* — Rob Swiatek
*Assistant Examiner* — Ebony Evans
(74) *Attorney, Agent, or Firm* — McCarter & English, LLP; David R. Burns

(57) ABSTRACT

A device and methods for catching, removing from within buildings, and releasing wild birds are provided. Sonic and/or dynamic characteristics of water are utilized as an attractant to lure birds towards a device for capturing birds. The attractant is located within a holding area of the device. The walls of the device are transparent and vented to allow the dynamic characteristics of the water to be seen from outside the device and to allow the sonic characteristics to be heard from outside the device. The device includes an opening that allows birds to enter the holding area of the device and that also prevents birds located within the holding area from exiting the device.

26 Claims, 7 Drawing Sheets

(56) References Cited

U.S. PATENT DOCUMENTS

| | | |
|---|---|---|
| 2005/0217605 A1 | 10/2005 | Reusche et al. |
| 2006/0156616 A1 | 7/2006 | Ried |
| 2006/0156995 A1 | 7/2006 | Ried |
| 2008/0165046 A1* | 7/2008 | Fullerton et al. .............. 342/21 |
| 2008/0190374 A1* | 8/2008 | Farris ............................. 119/74 |
| 2008/0210172 A1 | 9/2008 | Waikas |

* cited by examiner

WILD BIRD CATCH AND RELEASE DEVICE AND METHOD OF CATCHING AND RELEASING WILD BIRDS

RELATED APPLICATIONS

This Application claims priority to U.S. Provisional Patent Application Ser. No. 61/264,398 filed Nov. 25, 2009, the entire contents of which are herein incorporated by reference in their entirety.

FIELD OF THE INVENTION

The principles of the present invention relate generally to pest management and devices, systems and methods of capturing animals. More specifically, the principles of the present invention are concerned with devices and methods for catching, removing from within buildings, and releasing wild birds.

BACKGROUND OF THE INVENTION

Birds enter structures such as retail stores, warehouses, manufacturing facilities, and other high ceiling environments via shopping cart doors, loading docks, human entrances, and other openings in the structures. Birds typically enter commercial structures in hot, cold, or rainy weather to optimize their comfort and often teach other birds methods of ingress in the buildings. Seasonal migration can compound the problem.

Birds carry many diseases and pose direct health risks to employees and customers when they enter build structures, and present a risk of contamination to food in such environments. Techniques such as flushing, mist netting and harvesting are used in many commercial environments to remove wild birds from the interior of the structures and release them outside of the structure. Flushing can be accomplished by employees at the structure, but is relatively ineffective—particularly when a bird has been within the structure for more than forty-eight (48) hours. Mist netting and harvesting are techniques which must be performed by professional pest-control technicians, and can cost between $450 to $8000 for each service and depending upon the number of birds removed. In addition to the out-of-pocket costs for pest-control technicians to remove birds from buildings, in the case of a retail store, the store has to be shut down while pest-control technicians are working. In the case of a 24-hour retail business, a loss of sales and productivity occurs. Such store closings in the aggregate may mean a loss of millions or tens of millions of dollars per year even if the store closings occur late at night or in early morning hours (e.g., midnight to 6 a.m.).

A number of devices have been developed for trapping, capturing and/or isolating birds utilizing various methods of attractants, such as food and/or water. Food is typically not an ideal attractant in retail stores and other similar environments due to the ample supplies of easily accessible open food sources within such environments. Water, on the other hand, is typically in greater demand in such environments. Thus, open sources of water can be a very strong attractant in such environments. Nevertheless, devices of the prior art are not very successful in utilizing a water supply to attract birds for capture, particularly in large building structures in which birds may typically not recognize the fact that a source of water is located within the device unless the birds come in extremely close proximity to or even are captured within the device. For example, US Patent Application Pubs. 2006/0156616 and 2006/0156995 of William P. Ried, incorporated herein by reference in their entireties, both disclose devices for capturing birds within a holding pen. The device includes a waterer assembly in the holding pen in which water is heated to prevent it from freezing and held in an enclosed storage area. The assembly includes a plurality of drip tubes that extend into the storage area to provide water to birds within the storage area. The diameters of the drip tubes are sized such that water is drawn into the drip tubes through capillary action. Thus, unless a bird is in extremely close proximity to the waterer of Ried, such that the bird can see the water forming on the end of the drip tubes, the bird has no way to recognize that it can find water within the device of Ried. Therefore, it would be beneficial to provide a device and/or methods of capturing birds in which birds can easily recognize and be attracted toward a source of water from a distance.

A number of prior art devices such as bird baths, feeders and livestock watering troughs utilize the sonic and/or dynamic characteristics of water to either attract birds to those devices and entice them to eat or drink from the devices. Examples of such devices are shown in U.S. Pat. No. 4,149,490 to English, and U.S. Patent Application Pubs. 2005/0217605 of Reusch et al. and 2008/021072 of Walkas, the entire disclosures of which are incorporated herein by reference. Nevertheless, none of these devices provide any mechanism for capturing birds, nor a mechanism to utilize the water attractant to lure the birds into a holding area. Therefore, it would be beneficial to provide a device and/or methods that captures birds and that utilizes the sonic and/or dynamic characteristics of water to lure birds into a holding area.

SUMMARY OF THE INVENTION

The principles of the present invention comprise a device and method for catching birds within a building structure.

In one embodiment, the device includes an enclosed holding area that generally includes transparent and/or vented walls and top with an opening into the holding area. A door covering the opening allows a bird to enter the holding area from the exterior and deterring and/or preventing birds from exiting the holding area may be included. A water fountain within the holding area may include a pump for circulating water within the fountain to create dynamic motion and sonic characteristics in the water. In one embodiment, the fountain includes a power switch for turning the pump on and off.

In certain embodiments, the device includes a base that is removable from the walls. In certain embodiments, the walls include one or more horizontal slots through the walls, and the device further includes a slide member generally sized to fit within the one or more slots and extends generally across the holding area. Alternatively, rather than using slots and a slide member, the device may be divided into an upper portion and lower portion, where the upper portion is removable from the lower portion and operates as a containment enclosure for birds that are captured. In one embodiment, three or more portions, bottom, middle, and top portions may provide for different functionality, where the top portion functions as a bird capture area, middle portion functions as a spacer, and bottom portion functions as a water reservoir.

In other embodiments of the device, the walls are a generally solid transparent material. In some such embodiments, the walls are plexi-glass. Other substantially transparent materials may alternatively be utilized.

In one embodiment of the device, a top is vented. For example, the top and/or sides may be a wire grid.

In one embodiment, a method of catching birds may include placing a water source within an enclosed holding area. The holding area may include an opening and a door covering the opening. The door may be configured to allow a bird to enter the holding area from the exterior and deter or prevent the bird from exiting the holding area. A pump may be activated to circulate water within the water source. The pump creates visible dynamic characteristics and audible sonic characteristics in the water. The enclosed holding area is placed within a building structure in which a bird is located. The bird may be captured within the holding area as the bird is attracted and enticed to enter the holding area by the dynamic and/or sonic characteristics of the water.

In one embodiment, a slide member may be horizontally inserted through the holding area to isolate the bird within a portion of the holding area. The holding area may be removed from a base at the bottom of the holding area and taken outside of the building structure. The slide member may be removed, thereby releasing the bird from the portion of the holding area by allowing the bird to exit the holding area through the bottom. A pump may be activated when a bird is located within a building structure. The pump may be deactivated when no birds are located within the building structure, thereby saving power, battery or otherwise.

One method for configuring a bird capture device may include providing a first portion of the bird capture device configured to provide a water reservoir for water to be stored. A second portion of the bird capture device may be positioned to be supported by the first portion. A third portion of the bird capture device may be positioned to be supported by the second portion, the third portion being generally transparent and including openings that allow for audible noises to exit therefrom and an opening with a door that allows a bird to enter but not exit the third portion, the third portion further including a component of a water fountain that circulates water from the water reservoir that creates a sonic characteristic and enables birds that enter the third portion to drink the water.

One embodiment of a bird capture device may include a first portion configured to provide a water reservoir for water to be stored. A second portion may be supported by the first portion. A third portion may be supported by the second portion. The third portion may be generally transparent and include openings that allow for audible noises to exit therefrom. The third portion may include an opening with a door that allows a bird to enter but not exit. The third portion may further include a component of a water fountain that circulates water from the water reservoir that creates a sonic characteristic and enables birds that enter the third portion to drink the water.

The foregoing and other objects are intended to be illustrative of the invention and are not meant in a limiting sense. Many possible embodiments of the invention may be made and will be readily evident upon a study of the following specification and accompanying drawings comprising a part thereof. Various features and sub-combinations of invention may be employed without reference to other features and sub-combinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF THE DRAWINGS

Figure 1:
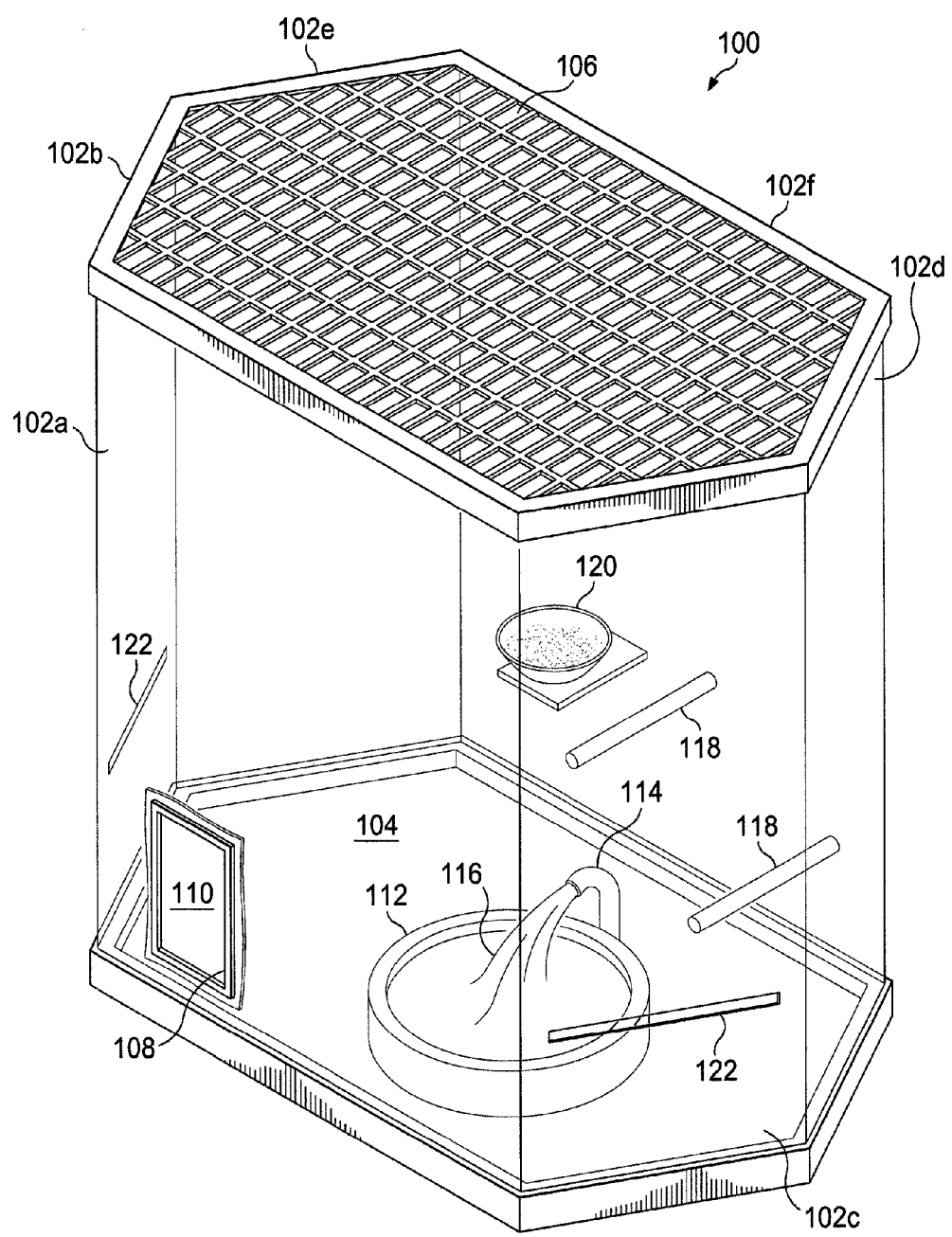
FIG. 1 is front perspective view of an illustrative device using the principles of the instant invention for catching wild birds.

Referring to FIG. 1, a device of an embodiment of the instant invention for catching wild birds is shown and described. The device of FIG. 1 is a cage or trap for catching wild birds that make their way into a building structure, such as a retail shopping center. The wild bird catching and release device (trap) 10 includes sidewalls 102a-102f (collectively 102), bottom base 104 and vented top 106, which together form a boxed-in holding area. Although the box of FIG. 1 includes six sidewalls, it will be appreciated that the shape of the box may vary without departing from the principles of the instant invention. By way of example only, the shape of the box (or holding area) may be square, octagonal, triangular, round, or any other suitable shape.

In the embodiment shown in FIG. 1, sidewalls 102 are made of a generally transparent material to enable the interior of the box to be easily seen from the exterior. In one embodiment, the sidewalls are made of plexi-glass. Nevertheless, it will be appreciated that alternative materials, such as wire mesh, may be utilized without departing from the principles of the instant invention. Also, in the embodiment shown in FIG. 1, top 106 of device 100 is made of a wire-mesh material. The wire-mesh provides venting for birds that are caught in the trap of the invention and held within the holding area, and also allow sound waves generated from within the trap to be broadcast toward the exterior of the trap. It will be appreciated that alternative materials for the top as well as the sidewalls may be utilized without departing from the principles of the instant invention. Furthermore, it will be appreciated that the top may be made of a generally solid material and then one or more of the sidewalls may include holes or other perforations, or may be made of a mesh material, to provide appropriate venting to the holding area.

Sidewall 102a includes opening/port 108 through sidewall 102a to allow birds to enter the holding area from the exterior of the device. Door 110 may be mounted over opening 108. In the embodiment shown in FIG. 1, door 110 is a weighted fabric material that is attached on the inside of wall 102a toward the top of opening 108. As a bird pushes inward on door 110 the bird is able to enter the holding area. Once the bird pushes far enough into storage area to move past door 110, the weight of the material causes door 110 to seal the bird inside device 100. Door 110 is dimensioned slightly larger than opening 108 to create a seal over opening 108. It will be appreciated that alternative opening and door structures may be utilized without departing from the principles of the instant invention. For example, the door structure may be a mesh screen or comb that is one-way hinged to enable a bird to enter, but not exit, the opening 108.

Device 100 includes a small water fountain 112 located within the holding area on base 104. The water fountain includes a pump (not shown) that circulates water drawn from basin 116 through tube 114 to fountain 112. The flow/splashing/movement of the water can be heard from the vented top 106 such that the fountain serves as an attractant to birds located within the building structure in which the device 100 is located. In one embodiment, the pump for the fountain is activated and deactivated by a switch (not shown) operably connected to the pump such that the fountain can be (and would only need to be) turned on when birds are in the facility (building structure) in which the device 110 is located. In one embodiment, the pump is powered by batteries stored in a battery compartment within fountain 112. In an alternative embodiment, the pump is powered by a separate power source that is connected to the pump. In some embodiments, the switch to activate and deactivate the pump is located on fountain 112. In an alternative, preferred embodiment the switch is located separate from fountain 112 such that the pump may be activated and deactivated without requiring the operator to enter the interior holding area of device 100. In one such embodiment, the switch is located on the exterior of device 100. In an alternative embodiment, the switch is located remote from device 100 in a location within the facility in which the device is located. In one embodiment, the remotely located switch may be wirelessly connected to the pump of fountain 112.

The device 100 includes roosting points 118 attached to one or more of the sidewalls and a feeding well 120 mounted to one of the side walls to hold bird seed. It will be appreciated that the location of roosting points 118 and feeding well 120 may vary and/or manner of mounting the same within device 100 may vary without departing from the principles of the instant invention. The bird seed feeder well 120 may be removably mounted to one of the walls within the holding area and can be removed from inside the box and filled with seed and then replaced. Alternatively, in addition to or rather than using a bird seed feeder well 120, the bird seed may be placed on the bottom or floor of the holding area, thereby eliminating the need for the feeder well 120.

The device may have slots 122 located in each of walls 102b and 102c. A fitted piece of plexi-glass (or other suitable material for a slide member) (not shown) that is dimensioned to slide within slots 122 slides into the slots sealing the bottom of the holding area of device 100 to trap the birds in the portion of the holding area above the slots (between the slide member and the top 106 of device 100). The plexi glass top portion of device 100, which includes sidewalls 102 and top 106 are removably mounted to base 104 and can be removed from base 104 of the device leaving the water fountain 112 and base 104 behind. When the bird is captured in the isolated portion of the holding area by the slide member, the top portion of device 100 can be removed from base 104 without allowing the bird (or birds) to escape. The top portion of plexi-glass box may then be taken outside the facility and the slide removed to release the birds from the device.

In one embodiment, the device base 104 is constructed of plastic or other suitable material that can be easily cleaned and sanitized. The interior of the box can be cleaned and sanitized between uses.

The device 100 may include mounting hardware to allow the device to be mounted on the wall. Alternatively, a separate "hunting tree stand" configured platform may be used to mount a horizontal platform to a pole, beam, wall, or other fixture. The hunting tree stand platform may be used to support the device within the building in a position that is high where the birds tend to congregate and in an out-of-sight position from customers. As understood in the art, a hunting tree stand has a strap or other connector that attaches to sides of and toward a front end of a platform away from a tree and that is positioned at an angle above the platform and includes a clamp or other attachment member that connects at or near the position of the tree that extends perpendicularly outward from the tree. It should be understood that alternative fixture mounting configurations may be utilized to position a bird capture device with a building. Of course, the bird capture device may be positioned on an existing shelf or other surface already existing within the building as opposed to a separate platform being installed.

Figure 2:
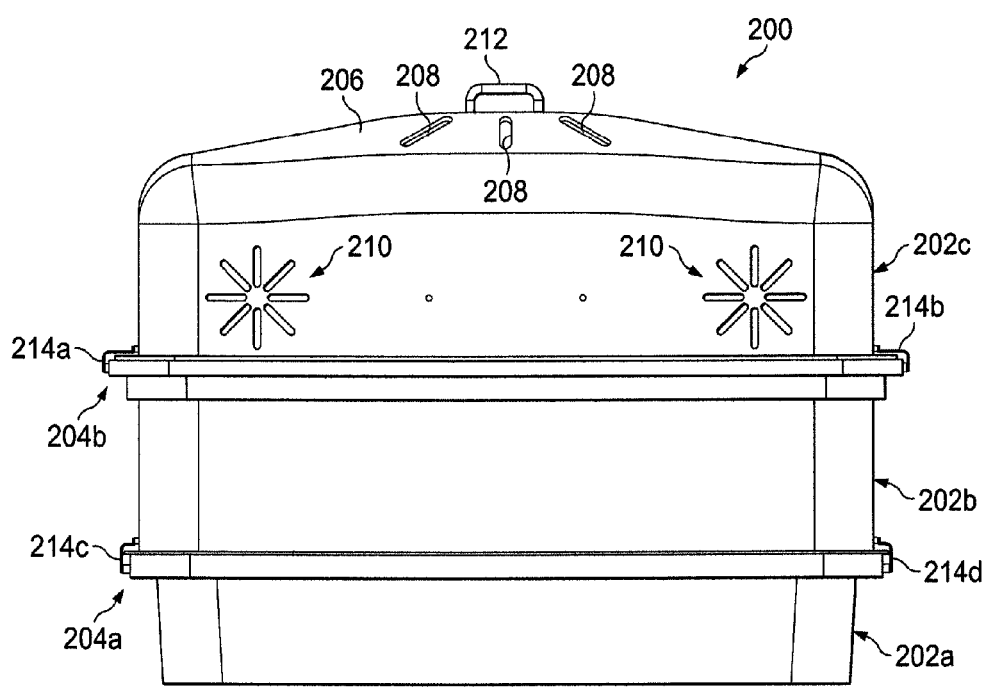
FIG. 2 is a cut-away view of an illustrative alternative embodiment from FIG. 1 of a cage for capturing and releasing wild birds.

The device may be sized to be large enough to catch multiple birds within the holding area before the birds have to be released outside the facility. Nevertheless, it will be appreciated that either smaller or larger holding areas may be utilized without departing from the principles of the instant invention. Referring to FIG. 2, an illustration of an illustrative alternative configuration of a wild bird capture device 200 is shown. The device 200 may include a bottom portion 202a, middle portion 202b, and top portion 202c. Although shown as having three different portions 202a, 202b, and 202c, it should be understood that the number of different portions may vary and still provide for the functionality in accordance with the principles of the present invention. As is further shown herein, the bottom portion may be used as a water reservoir for use in attracting birds to the device 200. The middle portion 202b may be used as a spacer to assist in conveying water. The top portion 202a may be used in presenting food and water to birds and capturing the birds for release. Between bottom and middle portions 202a and 202b is an interface 204a, and between the middle and top portions 202b and 202c is another interface 204b. The interfaces 204a and 204b are used to support the middle and top portions 202b and 202c in a stacked configuration and allow a user to easily open the device 200 for cleaning, water filling, food replacement, transport, bird release, repair, and other purposes.

The top portion 202c may include a substantially transparent cover 206 that includes openings 208 to operate as air vents for birds that are captured. The openings 208 may also be used to allow for water noise produced by a water fountain (not shown) contained within the device 200 to be projected for birds to hear. Additional openings 210 may be positioned on a side of the top portion 202c may also be used to allow for air to enter and water noise to exit the top portion 202c of the device 200. The openings 210 may be configured in a decorative or ornamental design that represents a trademark or logo of a company that is using the device 200 to capture birds.

To allow for easy transport, a handle 212 may also be included on the top of the cover 206. Alternatively, handles (not shown) on the side of any of the portions 202 may be included to allow one or two people to carry the device 200 from the sides. The handle may be integrated into the cover 206 so that it is flush with the cover 206. So that someone can carry the device 200 by the handle, in one embodiment, latches 214a-214d (collectively 214) may be used to secure the portions 202 together. In another embodiment, straps (not shown) that are attached to the bottom portion 202a, wrap around the top portion 202c, and secure using a buckle, clasp, Velcro® connection, clamp, pin, or other securing technique may be utilized. In an alternative embodiment, one or more bungee cords may be utilized. It should be understood that other components may be incorporated or separately provided to maintain the device 200 in a fully configured structure for transporting from location to location.

Figure 3A:
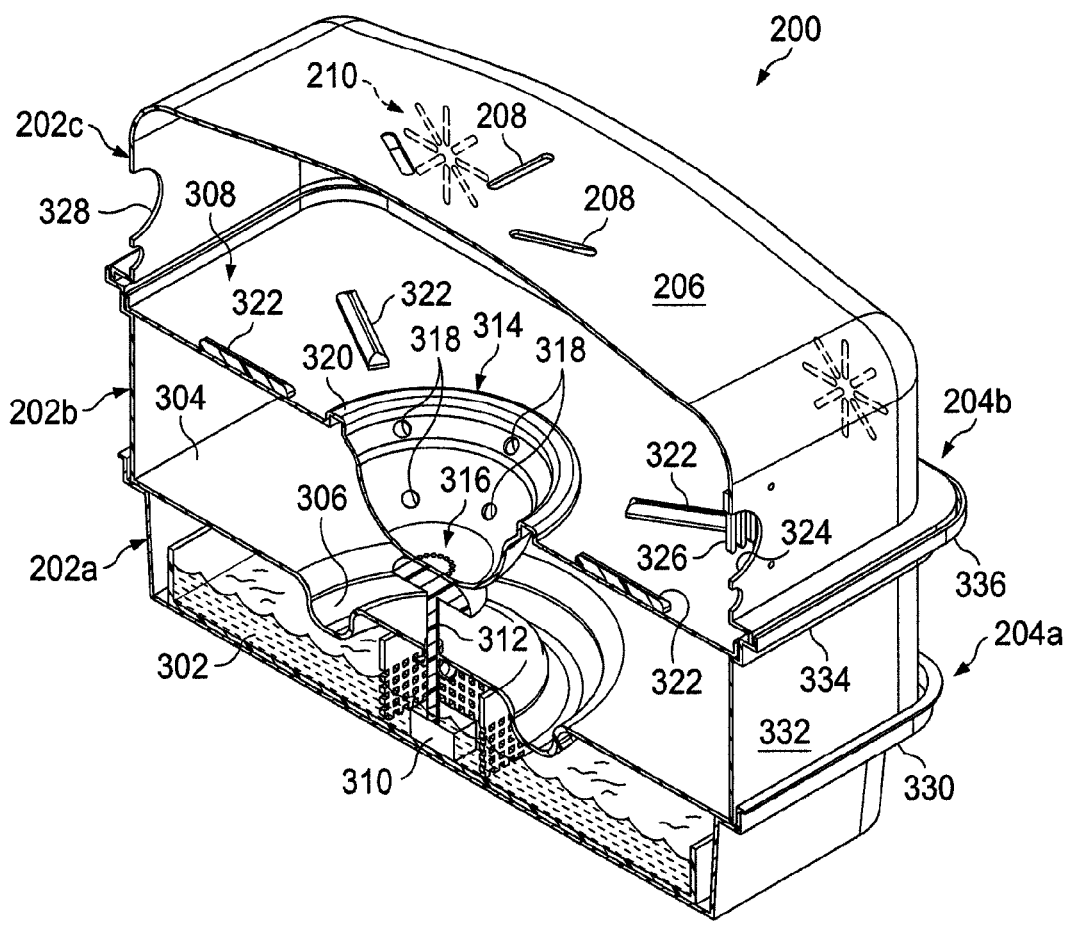
FIGS. 3A and 3B are an illustration of external side views of the cage of FIG. 2.

Regarding FIG. 3A, an illustration of a sectional view of the bird capture device 200 of FIG. 2 is shown. The inside of the device 200 is shown to include a water reservoir 302 in the bottom portion 202a of the device 200. The water reservoir 302 may fill the entire bottom portion 202a or a more limited reservoir may be configured in the bottom portion by setting up walls in which water may reside. The water reservoir 302 may have a volume that allows for a circulating water a certain amount of continuous time, such as a week, before the water evaporates and/or splashes out either in the top portion 202c or middle portion 202b to the point of having to be refilled. A bottom member 304 of the middle portion 202b may be used as a support structure for a water capture drainage trough 306, which collects water and drains the water into the reservoir 302 via openings (not shown) at the bottom of the trough 306.

Figure 3B:
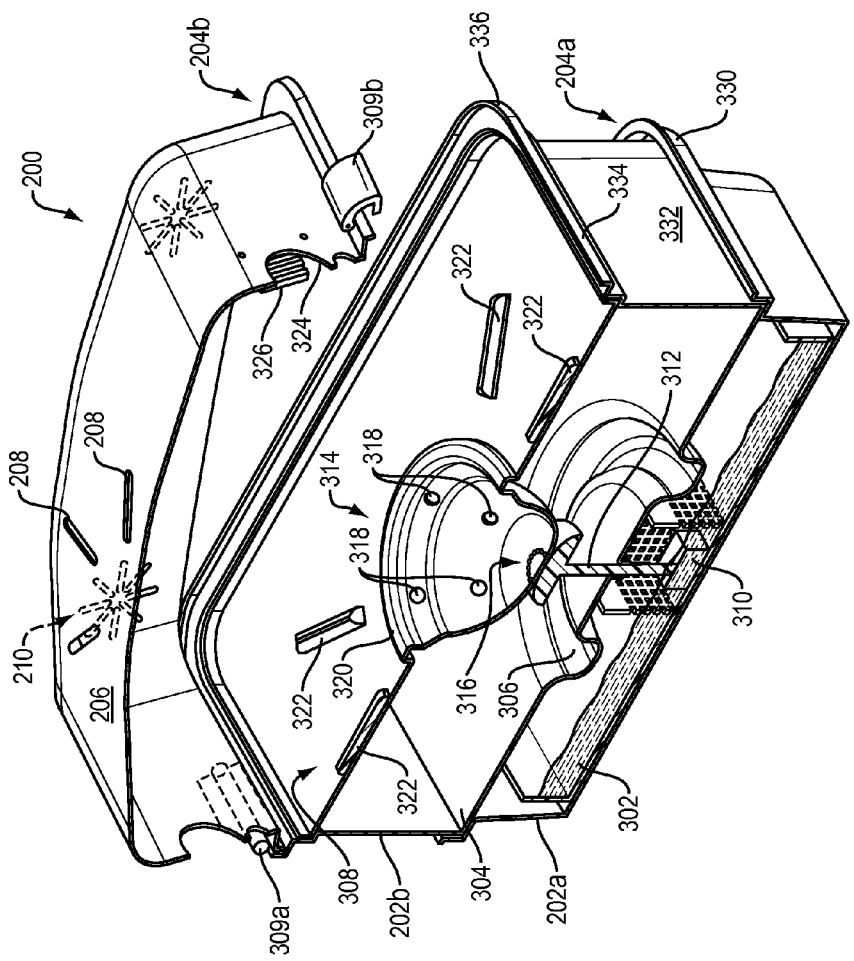

Referring to FIG. 3B the top portion 202c of the device 200 may be defined by a floor 308 and cover 206. The floor 308 may be integrated with the top portion 202c or be a separate component. In one embodiment, the top portion 202c and floor 308 may be integrated via a hinge 309a that connects to both the floor 309 and top portion 202c, and allows for the cover 208 and floor 308 to partially separate from one another to allow for release of birds captured by the device 200 without being fully separated. So that the bird cannot escape during transport, a clasp 309b or other securing mechanism(s) may be included on an opposite end of the hinge. To release a bird, the clasp 309b may be released to separate the floor 308 from the top portion 202c.

Referring to FIG. 3A, a pump 310 may be used to pump water from the reservoir 302 through a conduit 312 that passes through the water capture drainage trough 306 and/or floor 304 of the middle portion 202b. The pump 310 is shown to be positioned in the bottom portion 202a. It should be understood that the pump may be positioned elsewhere (e.g., middle portion 202b) and have a conduit extending from the pump to the reservoir 302. In one embodiment, the conduit 312 extends upward to a basin 314. It should be understood that the basin 314 may be shaped as a bowl or have any other shape that allows for water to be openly accessible to birds to view and drink from when captured in the device 200. The basin 314 may have an opening 316 through which water passes through from the conduit 312. The water that passes through the conduit 312 may cause a fountain of water to form within the basin 314, thereby causing water noise and splashing to occur so as to attract birds to the device 200. The basin 314 may have additional 12 holes 318 that allow water to drain. By allowing the water to drain through the holes 318 in the basin 314, the water is prevented from overflowing the basin 314 and allows for circulation of the water. By circulating the water, the water is kept fresh and reduces the likelihood of algae or other matter from contaminating the water or causing undue odors.

A rim 320 may extend around the basin 314 that operates as a perch on which birds may stand and drink from water in the basin 314. Additional perches 322 may be positioned on the floor 308. The perches 322 may be connected to the floor using fastening hardware (e.g., nuts and bolts), fastening adhesive (e.g., epoxy, double-sided tape), or any other means. Alternatively, the perches 322 may be formed in a molding or other process by which the floor 308 is formed.

The cover 206 is shown to have an opening 324. The opening 324 may be positioned on the side of the cover 206 and have a perch (not shown) extending in front of the opening 324 to enable birds to land and enter into the opening 324.

In one embodiment, a door 326 may be positioned inside the opening 324 and be connected by a one-way hinge (not shown) so that after the bird enters the device 200, the bird is unable to exit from the opening 324. The door 326 may have a comb configuration, as shown, that allows the birds to view inside the device 200 and hear water splashing in the fountain basin 314. It should be understood that alternative configurations of the door 326 may be utilized. As shown, another opening 328 may be positioned on the other side of the device 200. There may be one or more openings and be sized for different sized birds or other animals (e.g., squirrels).

As previously described, the middle and top portions 202b and 202c stack on top of one another. In doing so, interface 204a includes a bottom lip 330 in which a bottom edge of side wall 332 sits. Similarly, interface 204b may include a pair of lips 334 and 336, where the floor 308 rests on the lower lip 334 and the cover 206 rests on the upper lip 336. It should be understood that the lips may have a rubber, silicone, felt, or other material that provides a higher coefficient of friction than the materials of the floor 308, cover 206, sidewall 332, and so on, thereby reducing the potential for someone carrying the device 200 to accidentally drop the middle or top portions 202b and 202c. Although not shown, latches or other securing mechanisms may be used to connect the top portion 202c with the floor 308 and/or middle portion 202b so that a user may carry a portion of the device with a captured bird for release outside without having to carry the bottom portion 202a that includes the water reservoir 302. It should be understood, however, that no latches or other connection devices may be needed to carry a portion of the device 200 that excludes the bottom portion 202a.

In operation, when personnel in a building, such as a store, warehouse, or otherwise, recognize that a bird has entered the building, someone may turn on the pump 310. In one embodiment, assuming there is sufficient water in the reservoir 302, the pump 310 may be turned on remotely using a remote control device (not shown), thereby eliminating the need for someone to have to climb a ladder to reach the device 200. A visual (e.g., LED) or audio (e.g., beeping tone) indicator at the device or remote controller may be used to notify a user that the water reservoir 302 has dropped or is currently below a certain level. The remote control device may be wired or wireless. Alternatively, a user may climb a ladder or otherwise climb or use a lift to reach the device 200 to turn on the pump 310 using a switch (not shown) positioned at the device 200.

Figure 4:
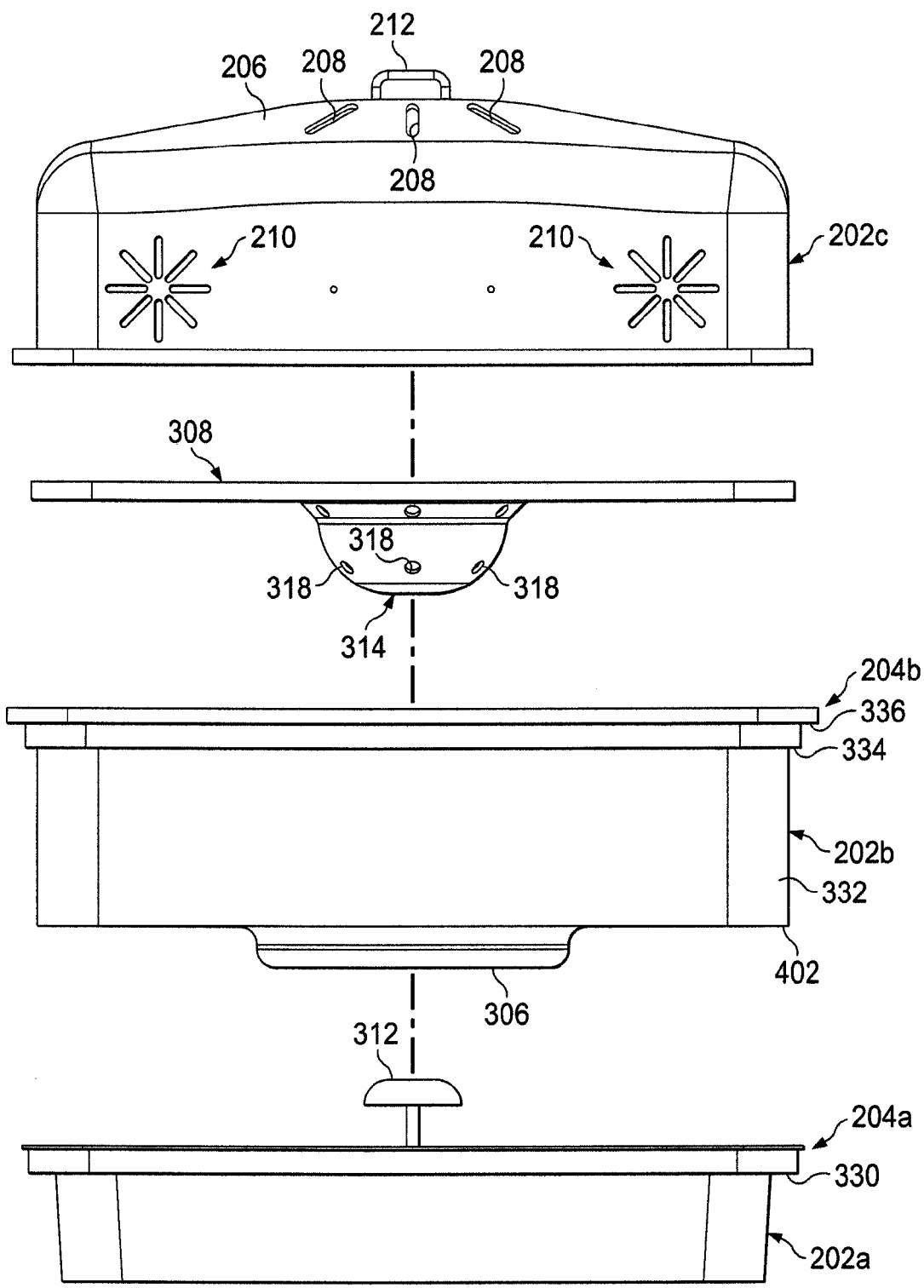
FIG. 4 is an illustration of an exploded view of the cage of FIG. 2.

Regarding FIG. 4, an exploded view of the device 200. As shown, the bottom portion 202a includes interface 204a with lip 330 in which a bottom edge 402 of sidewall 332 sits. The conduit 312 is shown to have a mushroom shape that is used to seal in opening 316 (FIG. 3) for water to be projected into the basin 314. As further shown, the water capture drainage trough 306 extends below the bottom edge 402 of the middle portion 202b. However, in an alternative embodiment, the drainage trough 306 may be fully contained within the middle portion 202b. In yet another embodiment, the middle portion may simply have an opening that allows for water that drains from the basin 314 to drop directly into the water reservoir 302 in the bottom portion 202a. The interface 204b is shown to include two lips, a lower lip 334 and upper lip 336. The lower lip 334 is used to support the floor 308, while the upper lip 336 is used to support the cover 206 of the top portion 202c. It should be understood that alternative configurations for the interface 204b may be utilized, including an interface with a locking mechanism to secure either or both of the floor 308 and top portion 202c with the middle portion 202b for transport and bird release purposes.

Figure 5:
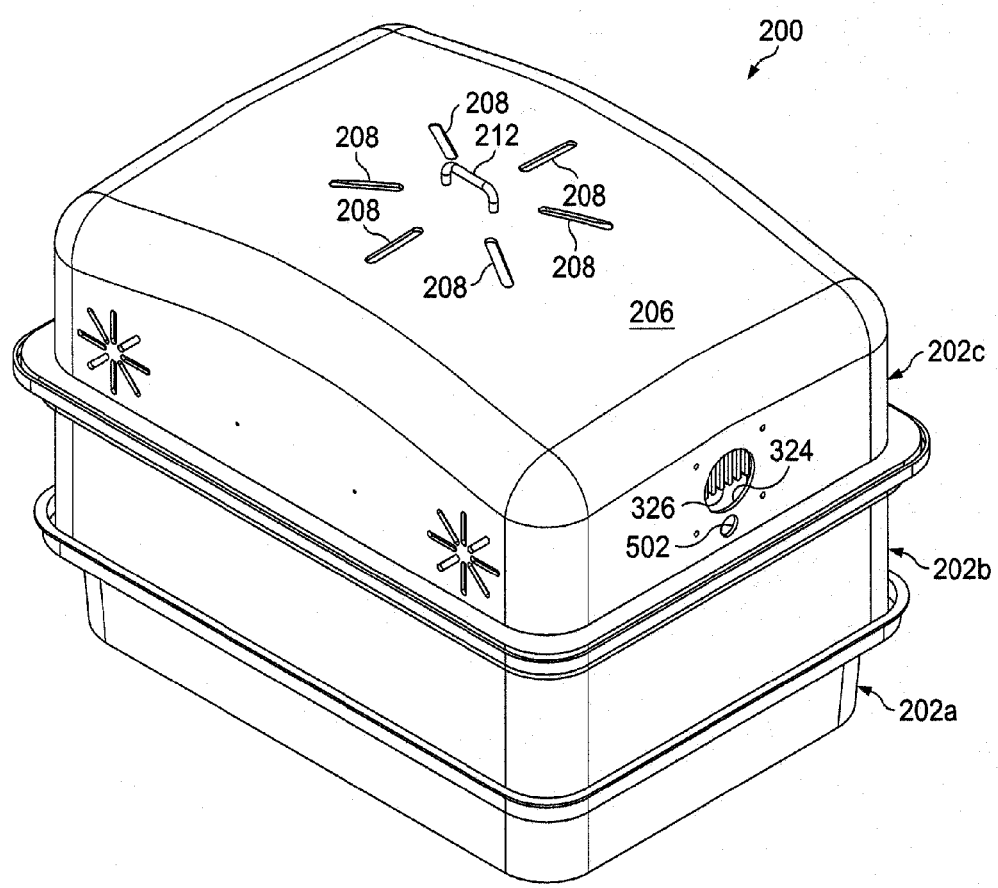
FIG. 5 is an illustration of an isometric external view of the cage of FIG. 2.

Regarding FIG. 5, an isometric external view of the cage 200 of FIG. 2 is shown. Although shown as opaque surfaces, it should be understood that the cover 206 may be generally transparent (e.g., transparent material, wire grid, etc. As shown, opening 324 has a door 326, which is shown as a comb configuration, is mounted to the inside wall of the cover 206 by a hinge (not shown). Another opening 502 may have a perch or other extension member, such as a dowel, extend therefrom so that birds that are attempting to enter the bird capture device 200 may land on and more easily enter the bird capture device 200. In one embodiment, the extension member is long enough on each side of the opening 502 to allow a bird to perch. Although the bird capture device 200 is shown to have three portions, it should be understood that two or more portions may be utilized in accordance with the principles of the present invention and that three portions for the device 200 is illustrative.

Once a bird is captured, the device 200 may be configured to notify an operator with a bird captured notification signal. The bird captured notification may be a mechanical notification (e.g., flag that extends in response to a bird landing on a perch internal to the device 200 or in response to the door being opened past a certain angle. Alternatively, an electronic notification may be used. The electronic notification may be responsive to a motion detector or electrically sensing the door opening past a certain angle, for example. Other electronic sensors, such as pressure sensors, may be utilized. The electronic notification may include turning on an LED on the device 200, generating an audible signal, communicating a signal to a remote controller to cause an audible or visual signal to be generated, or otherwise. Still yet, a communication device that is capable of communicating a message, such as a text message, may be utilized to communicate the bird captured notification to an operator in charge of capturing the bird.

Figure 6:
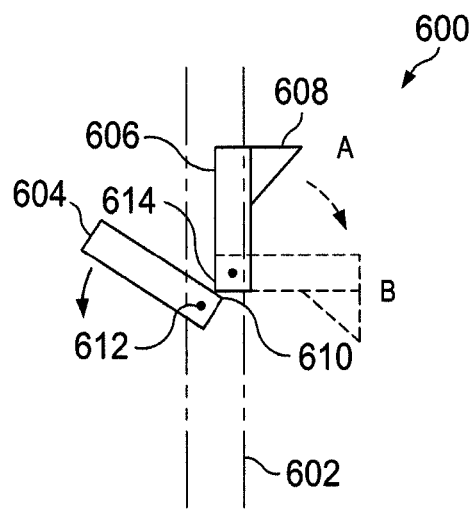
FIG. 6 is an illustration of a mechanical bird captured notification device for indicating when a bird is captured in a bird capture cage.

Referring to FIG. 6, an illustration of an illustrative bird captured notification signal 600 in the form of a mechanical element is shown. A sidewall 602 is shown to include a perch 604 that is positioned inside of a bird capture device. The perch 604 is shown as a cylinder that extends from the sidewall 602 and is angled upward. When a bird lands on the perch 604, the perch drops down to be horizontal. A flag stick 606 on which a flag 608 is mounted is shown to be positioned inside of and vertically along the sidewall 602. It should be understood that the flag stick 606 may alternatively be positioned outside of the sidewall 602. As the perch 604 drops downward, an inside tip 610 raised up due to being on the opposite side of a rotation pin 612. The inside tip 610 presses against a bottom end 614 of the flag stick 606, thereby causing the flag stick 606 to rotate downward from position A to position B. As a result, an operator can view that a bird has entered the bird capture device.

Figure 7:
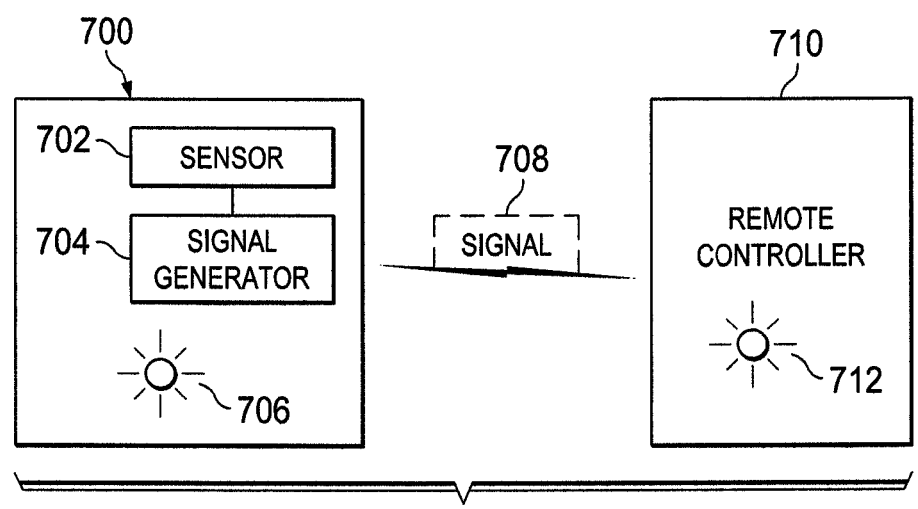
FIG. 7 is an illustration of an electrical bird capture notification device for indicating when a bird is captured in a bird capture cage.

Referring to FIG. 7, an electronic embodiment of a bird captured notification signal is provided. A bird capture cage 700, such as those shown in FIGS. 1 and 2, may include an electronic sensor 702. The electronic sensor may include a motion sensor, thermal sensor, optical sensor, pressure sensor, or any other sensor that may be utilized to detect whether a bird has entered the bird capture cage 700. A signal generator 704, which may be processor or discrete electronic circuit components based, may receive a signal from the sensor 702 and generate a bird capture signal. The bird capture signal may cause a visual indicator (e.g., LED) 706 or an audible indicator (e.g., beep tone from a speaker) (not shown) at the cage 700 to turn on. Alternatively, a signal 708 may be wired or wirelessly communicated to a remote controller 710 that may cause a visual indicator 712 or audible indicator (not shown) on the remote controller 710 to turn on. The signal may be analog or digital, as understood in the art.

By utilizing the principles of the present invention, birds may be captured in a building without harm during the capture and release operations. In addition, the bird capture device may be positioned in such a manner that it is not readily apparent to customers. Furthermore, the use of the bird capture device in accordance with the principles of the present invention allow for bird capture during operating hours such that the building does not have to be closed, thereby saving money and productivity in the case of the building being a retail store. There are many additional business favorable features provided by the principles of the present invention and use thereof.

In summary, the principles of the present invention provide for a method for configuring a bird capture device. The method may include providing a first portion of the bird capture device configured to provide a water reservoir for water to be stored. A second portion of the bird capture device may be positioned to be supported by the first portion. A third portion of the bird capture device may be positioned to be supported by the second portion. In one embodiment, the third portion is generally transparent and includes openings that allow for audible noises to exit therefrom and an opening with a door that allows a bird to enter but not exit the third portion. The third portion may further include a component of a water fountain that circulates water from the water reservoir that creates a sonic characteristic and enables birds that enter the third portion to drink the water.

The principles of the present invention may further include bird capture device that includes a first portion configured to provide a water reservoir for water to be stored. A second portion may be supported by the first portion. A third portion may be supported by the second portion. The third portion may be generally transparent and include openings that allow for audible noises to exit therefrom and include an opening with a door that allows a bird to enter but not exit the third portion. The third portion may further include a component of a water fountain that circulates water from the water reservoir that creates a sonic characteristic and enables birds that enter the third portion to drink the water. The component of the water fountain may be a basin that includes one or more openings that allow for water that enters the basin to be gravitationally dropped from the basin and into the second portion of the bird capture device. A floor member may be configured to be disposed between the second and third portions of the bird capture device, where the floor member is connected to the component of the water fountain. The bird captured device may further include a bird captured notification device for use in notifying an operator that a bird is captured.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modifications or variations may be made in embodying the above invention, and in the construction thereof, other than those specifically set forth herein, may be achieved by those skilled in the art without departing from the principles of the present invention, and that such changes, modifications or variations are to be considered as being within the overall scope of the present invention. Therefore, it is contemplated to cover the present invention and any and all changes, modifications, variations, or equivalents that fall within the true underlying principles disclosed and claimed herein. Consequently, the scope of the present invention is intended to be limited only by the attached claims; all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A device for catching birds, comprising:
an enclosed holding area, said holding area including generally transparent and/or vented walls and top;
a base having a first plurality of walls configured to support the generally transparent and/or vented walls and top, and from which the walls are removable;
a reservoir disposed in the base having a second plurality of walls separate from the first plurality of walls;
a floor configured to be disposed between said enclosed holding area and said base, and securable to said enclosed holding area, said floor further configured to support a basin;
an opening defined by a wall that enables a bird to enter into said holding area;
a door covering said opening, said door, when configured in a capture position, both allows the bird to enter said holding area from the exterior and deters the bird from exiting said holding area; and
a water fountain within said holding area, said water fountain including a pump for circulating water within said basin to create dynamic motion and sonic characteristics in the water.

2. The device according to claim 1, wherein said fountain includes a power switch for turning the pump on and off.

3. The device according to claim 1, wherein the base that is removable from the walls.

4. The device according to claim 1, wherein the walls are a generally solid transparent material.

5. The device according to claim 4, wherein the walls are plexi-glass.

6. The device according to claim 1, wherein the top is vented.

7. The device according to claim 6, wherein the top is a wire grid.

8. The device according to claim 1, wherein said door is connected to an inside wall of said holding area via a hinge.

9. The device according to claim 1, further comprising:
a hinge coupling a first side of said enclosed holding area and said floor; and
a securing member disposed on an opposite side of the first side, said securing member having a first configuration to maintain said enclosed holding area and said floor in a closed position and a second configuration to enable the floor to swing about said hinge to be in an opened position.

10. The device according to claim 1, wherein said floor and said basin are connected.

11. A method for catching birds, comprising:
placing a water source within an enclosed holding area, the holding area including an opening and a door covering the opening, the door allowing a bird to enter the holding area from the exterior and deterring the bird from exiting the holding area;
activating a pump to circulate water within the water source by delivering water from the water source into a basin positioned at an elevation higher than the water source, the activated pump causing visible dynamic characteristics and audible sonic characteristics of the water in the basin;
placing the enclosed holding area within a building structure in which the bird is located; and
capturing the bird within the holding area without human intervention as the bird is attracted and enticed to enter the holding area by the dynamic characteristics and audible sonic characteristics of the water in the basin.

12. The method according to claim 11, further comprising:
inserting a slide member horizontally through the holding area to isolate the bird within a portion of the holding area, the slide member forming a temporary bottom of the holding area to enable a top portion of the holding area to be separated from a base portion while maintaining the bird between the slide member and the top portion of the holding area;
removing the holding area from a base at the bottom of said holding area;
taking the holding area outside said building structure;
removing the slide member to release the bird from the portion of the holding area; and
allowing the bird to exit the holding area through the bottom of the holding area.

13. The method according to claim 11, wherein activating the pump is performed when a bird is located within the building structure, and further comprising deactivating the pump when no birds are located within the building structure.

14. The device according to claim 11, wherein said basin has holes that enable water in the basin to drain when the water reaches a certain depth in said basin.

15. The method according to claim 11, further comprising disposing a floor between the enclosed holding area and a base, the floor being securable to the enclosed holding area, and configured to support the basin.

16. The method according to claim 15, further comprising separating one side of the floor from the enclosed holding area while another side of the floor and enclosed holding area are maintained in rotatable connection with one another.

17. A method for configuring a bird capture device, said method comprising:
providing a first portion of the bird capture device configured to provide a water reservoir for water to be stored;
positioning a second portion of the bird capture device to be supported by the first portion;
positioning a third portion of the bird capture device to be supported by the second portion, the third portion being generally transparent and including openings that allow for audible noises to exit therefrom and an opening with a door that, when configured in a capture position, allows a bird to enter but not exit the third portion, the third portion further including a basin and a component of a water fountain that circulates water from the water reservoir in the basin to create a sonic characteristic and enables birds that enter the third portion to drink the water, the third portion further including means for capturing a bird within said third portion to transport the captured bird when said third portion is separated from said first and second portions;

separating the third portion from the second portion in response to a bird being captured within the third portion of the bird capture device to remove the bird; and displacing at least a portion of the means for capturing the bird to enable the bird to exit the third portion.

18. A bird capture device, comprising:
first portion configured to provide a water reservoir for water to be stored;
a second portion supported by the first portion;
a third portion supported by the second portion, the third portion including walls that are generally transparent and include openings that allow for audible noises to exit therefrom and an opening with a door that, when configured in a capture position, allows a bird to enter but not exit the third portion, the third portion further including a basin and a component of a water fountain that circulates water from the water reservoir in the basin to create a sonic characteristic and enables birds that enter the third portion to drink the water, the device further including means for capturing a bird within said third portion to transport the captured bird when said third portion is separated from said first and second portions; and displacing at least a portion of the means for capturing the bird to enable the bird to exit the third portion of the bird capture device.

19. The bird capture device according to claim 18, wherein the basin includes one or more openings that allow for water that enters the basin to be gravitationally dropped from the basin and into the second portion of the bird capture device.

20. The bird capture device according to claim 18, wherein the means for capturing the bird includes a floor member configured to be disposed between the second and third portions of the bird capture device, said floor member connected to the component of the water fountain.

21. The bird captured device according to claim 18, further comprising a bird captured notification device to notify an operator that a bird is captured.

22. A method for catching birds, comprising:
placing a water source within an enclosed holding area, the holding area including an opening and a door covering the opening, the door allowing a bird to enter the holding area from the exterior and deterring the bird from exiting the holding area;
activating a pump to circulate water within the water source, the activated pump causing visible dynamic characteristics and audible sonic characteristics in the water;
placing the enclosed holding area within a building structure in which the bird is located;
inserting a slide member horizontally through the holding area to isolate the bird within a portion of the holding area;
capturing the bird within the holding area as the bird is attracted and enticed to enter the holding area by the dynamic characteristics and audible sonic characteristics of the water;
removing the holding area from a base at the bottom of said holding area;
taking the holding area outside said building structure;
removing the slide member to release the bird from the portion of the holding area; and
allowing the bird to exit the holding area through the bottom of the holding area.

23. The method according to claim 22, further comprising setting the door in a capture position that both allows the bird to enter the holding area from the exterior and deters the bird from exiting the holding area.

24. A method for catching birds, comprising:
placing a water source within an enclosed holding area, the holding area including an opening and a door covering the opening, the door allowing a bird to enter the holding area from the exterior and deterring birds from exiting the holding area, the enclosed holding area further including a basin that is accessible to a bird within the enclosed holding area and a floor member disposed between the water source and the holding area;
activating a pump to circulate water within the water source by pumping water into the basin, the activated pump causing visible dynamic characteristics and audible sonic characteristics in the water in the basin, the activation being performed when a bird is located within a building structure;
deactivating the pump when no birds are located within the building structure; placing the enclosed holding area within the building structure in which a bird is located; capturing the bird within the holding area as the bird is attracted and enticed to enter the holding area by the dynamic characteristics and audible sonic characteristics of the water in the basin;
removing the holding area from a base supporting the enclosed holding area, the holding area inclusive of the floor and basin;
taking the holding area outside of a building structure;
at least partially adjusting the floor member to release the bird from the portion of the enclosed holding area; and
allowing the bird to exit the enclosed holding area through the bottom of the enclosed holding area from where at least a portion of the floor member had previously been positioned.

25. The method according to claim 24, further comprising setting the door in a capture position that both allows the bird to enter the holding area from the exterior and deters the bird from exiting the holding area.

26. A device for catching birds, comprising:
an enclosed holding area, said holding area including generally transparent and/or vented walls and top;
a base configured to support the generally transparent and/or vented walls and top, and from which the walls are removable;
an opening defined by a wall that enables a bird to enter into said holding area, wherein the walls include one or more horizontal slots defined by the walls, and wherein the device further includes a slide member generally sized to fit within the one or more slots and to extend generally across said holding area to enable a user (i) to capture a bird within said holding area and said slide member and (ii) to transport the captured bird when said enclosed holding area is separated from said base;
a door covering said opening, said door, when configured in a capture position, both allows the bird to enter said holding area from the exterior and deters the bird from exiting said holding area;
a water fountain within said holding area, said water fountain including a pump for circulating water within said fountain to create dynamic motion and sonic characteristics in the water; and
a basin through which said water fountain operates to circulate the water to create the dynamic motion and sonic characteristics.

* * * * *